A. J. DAVIS.
LIQUID TEMPERING DEVICE.
APPLICATION FILED NOV. 25, 1916.
1,298,906.
Patented Apr. 1, 1919.
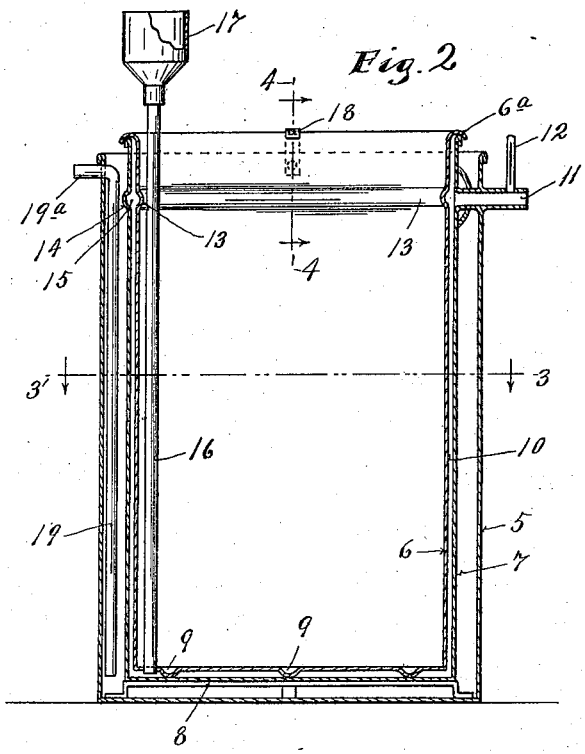
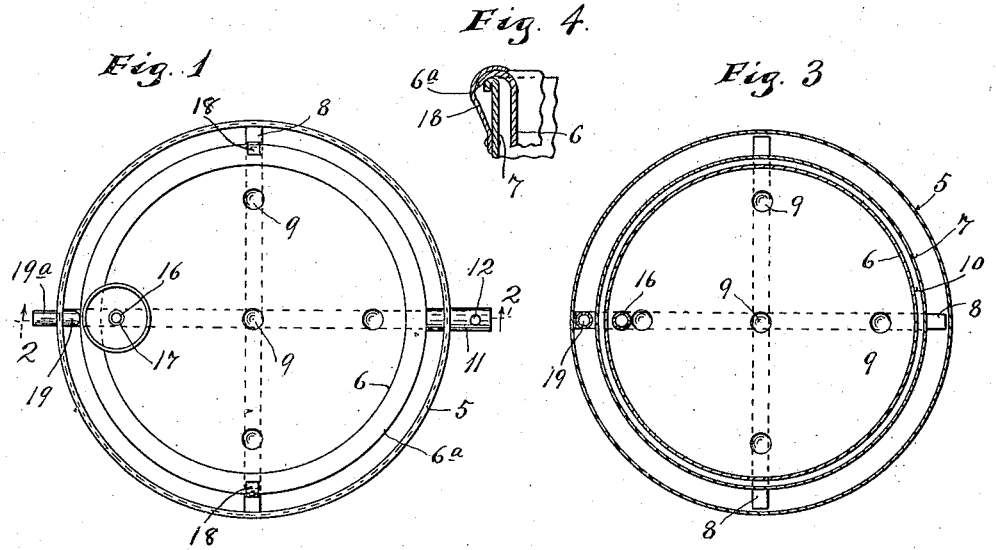
WITNESSES.
H. L. Opsahl.
A. H. Opsahl
INVENTOR.
A. J. DAVIS.
BY HIS ATTORNEYS
Williamson & Merchant

UNITED STATES PATENT OFFICE.

ALFRED J. DAVIS, OF MINNEAPOLIS, MINNESOTA.

LIQUID-TEMPERING DEVICE.

1,298,906. Specification of Letters Patent. Patented Apr. 1, 1919.

Application filed November 25, 1916. Serial No. 133,515.

*To all whom it may concern:*

Be it known that I, ALFRED J. DAVIS, a citizen of the United States, residing at Minneapolis, in the county of Hennepin and State of Minnesota, have invented certain new and useful Improvements in Liquid-Tempering Devices; and I do hereby declare the following to be a full, clear, and exact description of the invention, such as will enable others skilled in the art to which it appertains to make and use the same.

My invention relates to apparatus for tempering liquids and has for its particular object the provision of an extremely simple and highly efficient liquid tempering device adapted for use in tempering cream and milk, either by way of raising or lowering the temperature thereof.

Generally stated, the invention consists of the novel construction and combination of parts hereinafter described and defined in the claims.

In the accompanying drawings which illustrate the invention, like characters indicate like parts throughout the several views.

Referring to the drawings:

Figure 1 is a plan view of the tempering apparatus;

Fig. 2 is a vertical section on the line 2—2 of Fig. 1;

Fig. 3 is a horizontal section on the line 3—3 of Fig. 2; and

Fig. 4 is a fragmentary section on the line 4—4 of Fig. 2.

The apparatus is preferably of cylindrical form and is made up of three main elements, to-wit, an outer tank 5, an inner tank 6 and an intermediate tank 7, all of which tanks are made of thin sheet metal and have closed bottoms and open tops. The intermediate tank 7 is spaced a considerable distance inward from the sides of the outer tank 5 and above the bottom thereof and is supported in its elevated position by a sort of a spider bracket 8 formed by crossed metal bars having down-turned ends affording feet that rest upon the bottom of said outer tank. The inner tank 6 is spaced from, but very close to the intermediate tank 7, both at its sides and bottom, being supported from the bottom thereof by bosses 9 formed by depressions in the bottom of said inner tank 6. Thus an attenuated or thin tempering chamber 10 is formed between the side walls and bottoms of the two tanks or channels 6 and 7.

It is intended that the intermediate tank 7 shall remain permanently within the outer tank or shell 5, but that the inner tank 6 shall be freely removable from the said intermediate tank. At a point below the upper edge of the outer tank 5, the intermediate tank 7 is provided in one side with a discharge pipe 11 that extends through the wall of said outer tank and is shown as soldered thereto. The numeral 12 indicates a thermometer applied to the said discharge pipe 11. In the horizontal plane of this discharge pipe 11, the inner tank 6 is provided with an inwardly pressed bead 13 and the intermediate tank 7 is provided with an outwardly pressed bead 14. These two oppositely pressed beads afford, between the walls of the tanks 6 and 7, a horizontal annular channel 15 of much greater cross section than the space between the main walls of the tanks, and which, therefore, gives free horizontal flow of the liquid from the tempering chamber 10, through a feed pipe 16, which, at its upper end, is preferably provided with a receiving funnel 17. This feed pipe 16 extends vertically through the interior of the inner tank 6, is soldered, or otherwise, rigidly secured to one side thereof, and its lower end opens through the bottom of the said inner tank. This feed pipe is, therefore, removable from the apparatus with the inner tank.

The upper edges of the tanks 6 and 7 are above the upper edge of the outer tank 5 and the inner tank 6 is provided with an out-turned flange 6ª that overlaps the upper edge of the intermediate tank 7. The numeral 18 indicates spring latch hooks pivotally attached to the upper portion of opposite sides of the intermediate tank 7 and adapted to engage over the out-turned flange 6ª of the inner tank 6, to hold the inner tank down within the intermediate tank, or, in other words, to prevent the same from floating when the tempering chamber 10 is filled with liquid and the inner tank is empty, as will be the case when the apparatus is being flushed with hot water, for example.

The numeral 19 indicates an overflow pipe which leads from the lower portion of the outer tank 5, is attached to one side of said outer tank and has an out-turned discharge end 19ᵃ extended through the same at a point below the extreme upper edge of said tank 5, but above the level of the discharge pipe 11.

When the apparatus is to be used for the cooling of a liquid such as milk or cream, for example, ice may be packed within the inner chamber 6, and if desired, also, in the annular chamber formed between the outer chamber 5 and intermediate chamber 7, or cooled water may be continuously run into the inner chamber 6 and allowed to flow over the out-turned flange 6ᵃ thereof and into the said space between the tanks 5 and 7. The water that overflows the said flange 6ᵃ cannot directly pass out through the overflow tube, but must first move to the bottom of the tank 5, from whence it finds its escape upward through the overflow pipe 19. The out-turned end 19ᵃ of the said overflow pipe determines the altitude of the cooling water within the outer water chamber, but the inner tank 6 must, of course, be completely filled with water before it will overflow therefrom. The said out-turned flange 6ᵃ, of course, prevents the water from flowing into the upper portion of the tempering chamber 10. By the above arrangement, the cooling water, both at the inner side and at the outer side of this tempering chamber is kept always above the discharge pipe 11, and consequently, above the altitude of the cream or milk within the said tempering chamber.

The milk or cream or other liquid to be cooled will be continuously fed to the bottom of the tempering chamber 10 through the feed pipe 16. In passing upward through the tempering chamber, the milk, cream or liquid to be tempered or cooled, is reduced to a very thin annular sheet, preferably from one-sixteenth to one-eighth of an inch in thickness and will be subjected to the cooling action of the tempering water on both sides, so that it will not only be rapidly, but very thoroughly and efficiently cooled.

When the device is to be used for heating milk, cream, or the other liquid, hot water instead of cold water will, of course be used. When the device is to be cleaned, the inner tank 6, with feed tube 16, may be readily removed and when this is done, access to the complete exterior of the said inner tank and to the complete interior of the intermediate tank is afforded. The apparatus is, therefore, very easy to keep in a clean sanitary condition, and, furthermore, it is highly efficient for the purposes had in view. It is especially efficient for use, either in cooling or for sterilizing cream and milk.

This tempering device also affords an efficient pasteurizing apparatus, in the use of which, the milk, cream or other liquid being pasteurized will not be exposed to the air or dust in the room, nor will it be exposed to the temperature of the room. Pasteurization of milk, for example, requires a temperature of from 140 to 145 degrees F., and the milk may be brought to this temperature by circulating water through the apparatus at a temperature of from 150 to 160 degrees, and without at any time overheating any portion of the milk to such an extent that it will be given a scorched taste or causing it to coat up the heating surface of the apparatus.

Atention is also called to the fact that the attenuated tempering chamber 10 extends to an altitude considerably above the discharge pipe 11 and reversely bulged beads 13 and 14, so as to afford a space to receive the foam and permit the same to settle without overflowing at the point between the upper edges of the tanks 5 and 6.

What I claim is:

1. A tempering apparatus comprising outer, inner and intermediate tanks telescoped one into the other, the said inner and intermediate tanks being spaced apart to form an attenuated tempering chamber, and the said intermediate and outer tanks being spaced apart to afford the water jacket, said inner tank being removable and having a pipe extended therethrough to the bottom of said tempering chamber, said intermediate tank having a discharge pipe extending outward through said outer tank at a point below the top thereof, the said outer tank having an overflow pipe leading from its lower portion upward and outward therefrom, at least one of the said tanks that form said attenuated tempering chamber having a bulged bead in the plane of the discharge pipe of said intermediate tank, for affording a free flow from the upper portion of said tempering chamber to the said discharge pipe.

2. A tempering apparatus comprising outer, inner and intermediate tanks telescoped, one into the other, the said inner and intermediate tanks being spaced apart to form an attenuated tempering chamber and the said intermediate and outer tanks being spaced apart to form a water jacket, said inner tank being removable and having a feed pipe extending therethrough to the bottom of said tempering chamber, said intermediate tank having a discharge pipe extending outward through said outer tank at a point below the top thereof, and said outer tank having an overflow pipe leading from the lower portion, upward and outward thereof, the said inner and intermediate tanks having reversely bulged beads in the plane of the discharge pipe of said intermediate tank, for affording a free flow from the upper portion of the tempering chamber to the said discharge pipe.

3. A tempering apparatus comprising outer, inner and intermediate tanks telescoped, one into the other, the said inner and intermediate tanks being spaced apart to form an attenuated tempering chamber and the said intermediate and outer tanks being spaced apart to form a water jacket, said inner tank being removable and having a feed pipe extending therethrough to the bottom of said tempering chamber, said intermediate tank having a discharge pipe extending outward through said outer tank at a point below the top thereof, said outer tank having an overflow pipe leading from the lower portion, upward and outward thereof, the said inner and intermediate tanks having reversely bulged beads in the plane of the discharge pipe of said intermediate tank, for affording a free flow from the upper portion of the tempering chamber to the said discharge pipe, the said inner and intermediate tanks being extended materially above said beads and the said inner tank having an out-turned upper edge that overlaps the upper edge of said intermediate tank.

In testimony whereof I affix my signature in presence of two witnesses.

ALFRED J. DAVIS.

Witnesses:
CLARA DEMAREST,
F. D. MERCHANT.

Copies of this patent may be obtained for five cents each, by addressing the "Commissioner of Patents, Washington, D. C."